United States Patent
Arciuli

(10) Patent No.: US 8,467,045 B2
(45) Date of Patent: Jun. 18, 2013

(54) METHOD OF DETERMINING THE CONTACT ANGLE OF A BALL BEARING

(75) Inventor: Vito Arciuli, Molfetta (IT)

(73) Assignee: Aktiebolaget SKF, Göteborg (SE)

( * ) Notice: Subject to any disclaimer, the term of this patent is extended or adjusted under 35 U.S.C. 154(b) by 114 days.

(21) Appl. No.: 13/048,199

(22) Filed: Mar. 15, 2011

(65) Prior Publication Data

US 2011/0228261 A1  Sep. 22, 2011

(51) Int. Cl.
*G01B 11/16* (2006.01)

(52) U.S. Cl.
USPC .......................................................... 356/138

(58) Field of Classification Search
USPC .......................................................... 356/138
See application file for complete search history.

(56) References Cited

U.S. PATENT DOCUMENTS

| | | | |
|---|---|---|---|
| 5,263,372 A * | 11/1993 | Matsuzaki et al. | 73/593 |
| 5,423,218 A | 6/1995 | Matsuzaki | |
| 5,517,858 A * | 5/1996 | Matsuzaki et al. | 73/593 |
| 2006/0245677 A1 | 11/2006 | Kenworthy et al. | |

FOREIGN PATENT DOCUMENTS

| | | |
|---|---|---|
| EP | 0902257 A1 | 3/1999 |
| JP | 51026824 B | 8/1976 |
| JP | 52143955 U | 10/1977 |

OTHER PUBLICATIONS

English translation of JP 51-026824 Aug. 9, 1976 NSK Limited.*

* cited by examiner

*Primary Examiner* — Tu Nguyen
(74) *Attorney, Agent, or Firm* — Mark A. Ussai; Bryan Peckjian

(57) ABSTRACT

To determine the contact angle of a ball bearing, one of two rings is rotated while the other ring is held stationary. The number of revolutions of the rotated ring and the number of revolutions accomplished in the same period by the balls, and therefore by the retaining cage, are detected. The revolutions of the balls are detected through an optical detecting device which projects a radiation through the bearing, in the gap between the outer and inner rings, whereby the radiation is intercepted directly by the balls and/or the cage. The contact angle is determined using the following parameters: the number of revolutions of the rotating ring, the number of revolutions of the balls or of the cage, the diameter of the balls, and the pitch diameter.

8 Claims, 3 Drawing Sheets

METHOD OF DETERMINING THE CONTACT ANGLE OF A BALL BEARING

CROSS-REFERENCE

This application claims priority to Italian Patent Application No. TO2010A000197 filed on Mar. 16, 2010, the contents of which are incorporated fully herein by reference.

BACKGROUND OF THE INVENTION

The present invention relates to bearings, and more particularly to a method of determining the contact angle of a ball bearing.

U.S. Pat. No. 5,423,218-A discloses a method for measuring the contact angle based on the detection of radial vibrations, by means of a pickup sensor applied on the outer ring of the bearing. The inner ring of the bearing is rotated while the outer ring is held stationary and subjected to an axial load. The signal detected by the pickup is transmitted to a frequency converter through an amplifier. The frequency converter determines, by calculation, the frequency of rotation of the inner ring and the frequency of the number of passes of the balls, and from the computation of these frequencies, it calculates the contact angle.

According to a conventional method, described in Japanese utility model JP-52 143 955-U, the contact angle is arrived at by detecting two parameters: the rotation of the inner ring and the rotation of the ball retaining cage (which corresponds to the revolution of the balls about the central axis of rotation of the bearing). A screen with opaque sectors is fixed on the cage and the outer ring is held stationary. By making the inner ring rotate, the opaque sectors of the screen intercept the light beam of a photocell, providing for the detection of the rotation of the cage.

The abovementioned conventional method is not very precise and has limits of a practical nature. Specifically, for bearings of very small dimensions in which the space between the inner diameter of the outer ring and the outer diameter of the inner ring is minimal, applying a support on the cage for a screen with opaque sectors in order to detect the rotation of the cage is problematic. The fitting of the screen is made more difficult if the rings of the bearing are flanged, or if the bearing is already assembled in a defined apparatus/machine. The play existing between the balls and the seats of the cage in which the balls are housed does not allow to determine the angle of revolution of the balls accurately. Furthermore, the screen fitted to the cage increases the inertial mass of the same cage; i.e. it can cause the balls to slide along the raceways and negatively affect the precision of the measurement of the contact angle.

SUMMARY OF THE INVENTION

The primary object of the invention is to obtain a very accurate measurement of the contact angle, avoiding the limits of the above described prior art. Another object of the invention is to propose a simplified measuring method, which lends itself well to being automated.

These and other objects and advantages, which will appear more clearly hereafter, are achieved according to the invention by a method as defined in the accompanying claims. In summary, the invention proposes to determine the contact angle by detecting the rotation of the ball retaining cage (or the revolution of the balls) by means of optical detecting means which project a radiation through the bearing in the gap between the outer and inner rings. The radiation is thus intercepted directly by the balls and/or the cage, without applying bodies external to the bearing. A particularly precise measurement is obtained by using a laser radiation, i.e. a coherent collimated light beam and of uniform light density with a high degree of coherence.

BRIEF DESCRIPTION OF THE SEVERAL VIEWS OF THE DRAWINGS

There will now be described, by way of non-limiting example, a preferred embodiment of the method according to the present invention. Reference is made to the accompanying drawings, in which.

DETAILED DESCRIPTION OF THE INVENTION

Figure 1:
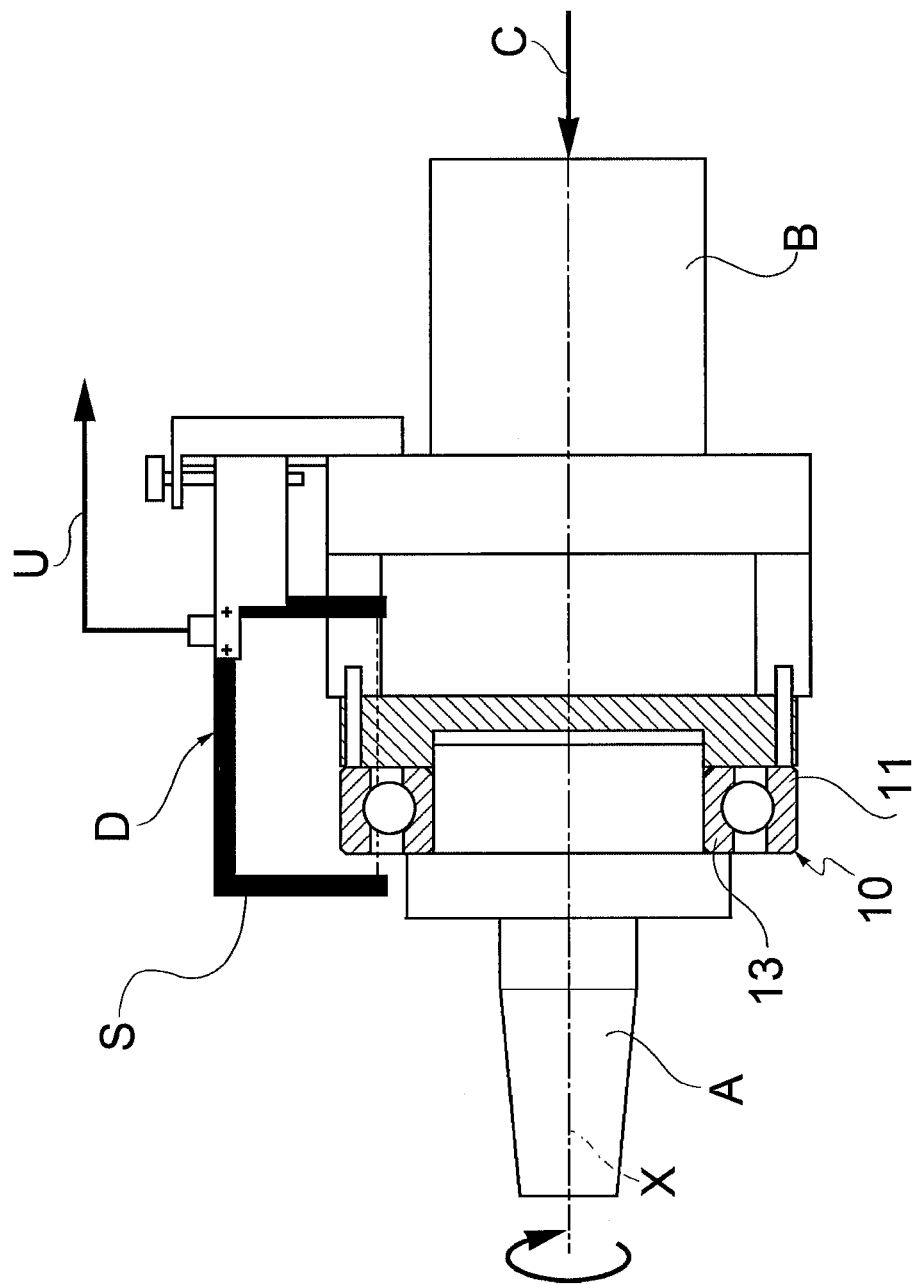
FIG. 1 schematically illustrates a bearing in axial cross-section, fitted on a rotating mandrel with an associated optical detecting device and a pusher assembly for executing the method of the invention.
Figure 2:
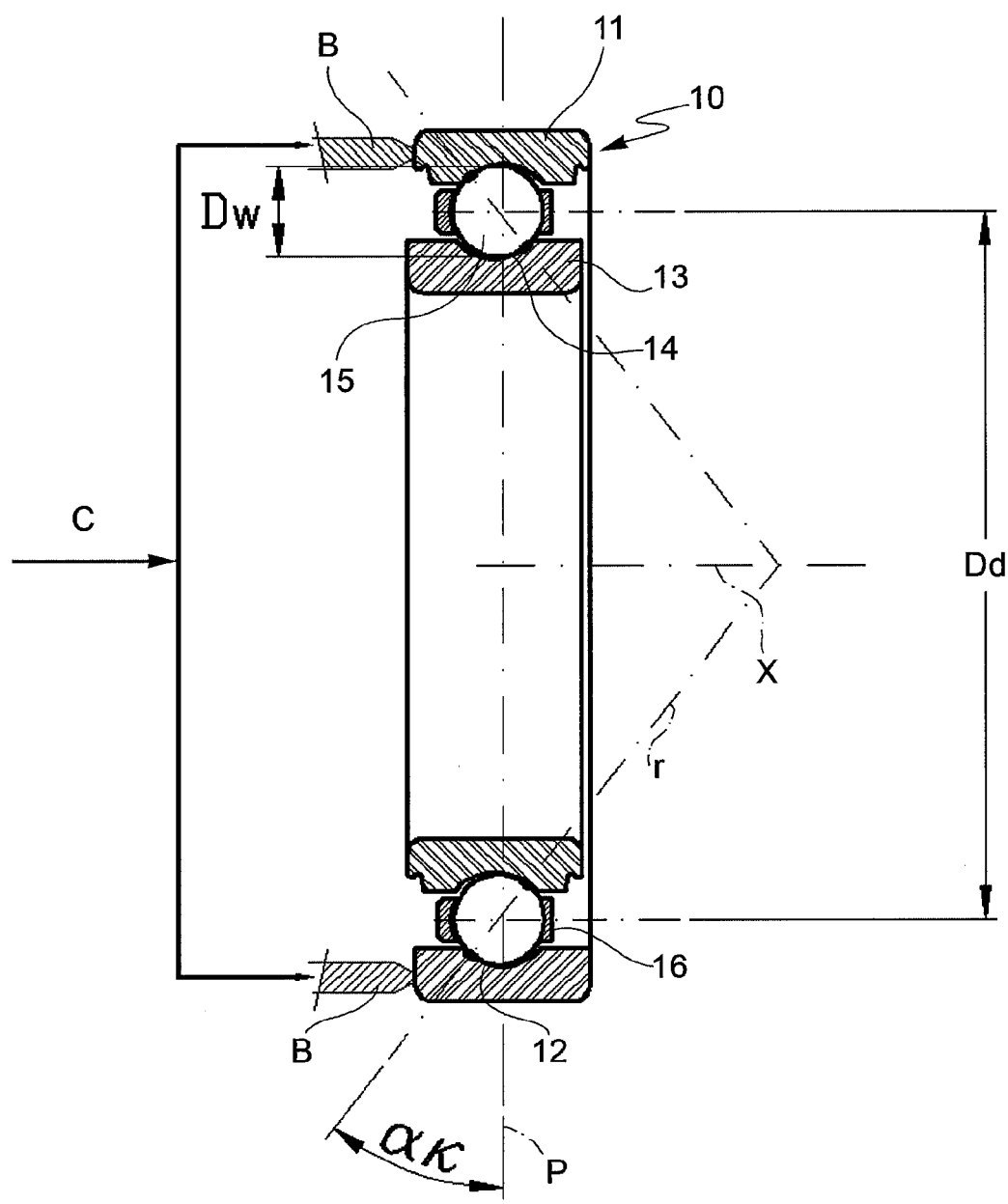
FIG. 2 is an axial cross-sectional view of a ball bearing.
Figure 3:
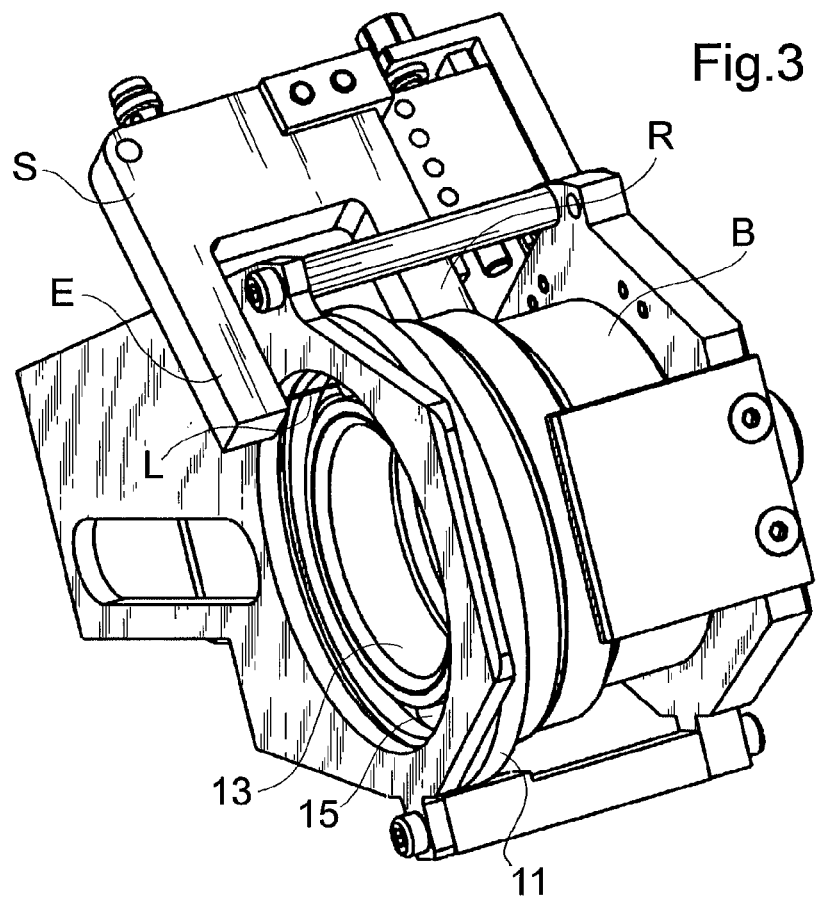
FIG. 3 is a perspective view of the optical detecting device and the pusher assembly of FIG. 1.

Referring initially to FIG. 2, designated at 10 in its entirety is a ball bearing for which it is desired to determine the contact angle αk. The bearing 10 has a central axis x and includes an outer ring 11 with an outer raceway 12 on an inner peripheral wall thereof, an inner ring 13 with an inner raceway 14 on an outer peripheral wall thereof, the inner ring 13 being spaced axially from the outer ring 11 so as to define a gap, and a plurality of rolling balls 15. The balls 15 are radially interposed between the outer and inner rings 11, 13, respectively, in order to roll along the outer 12 and inner 14 raceways. The balls 15 are circumferentially spaced from one another by a retaining cage of conventional design 16 disposed generally between the outer and inner rings 11, 13 and each ball 15 has a diameter $D_W$ substantially equal to the diameter $D_W$ of each other ball 15. In the bearing 10, a line r passing through the points of contact of each ball 15 with the outer raceway 12 and the inner raceway 14 is inclined by an angle αk (called "contact angle") with respect to a plane p passing through the center of a first ball and the center of a second ball located in a position diametrically opposite the first.

The bearing 10 is first placed on a revolving mandrel A inserted into the inner ring 13. A pusher assembly B applies to the outer ring 11 a constant axial load C, for example in the order of 50 N.

An optical detecting device D configured to project radiation is set up to project radiation through the bearing 10, in the annular space or gap between the outer ring 11 and the inner ring 13. In the preferred embodiment, the optical detecting device projects laser radiation L in a direction substantially parallel to the axis of rotation x of the bearing, such that when the mandrel A causes the inner ring 13 to rotate, the radiation L is intercepted by the balls 15 and/or by the cage 16 in motion.

Figure 4:
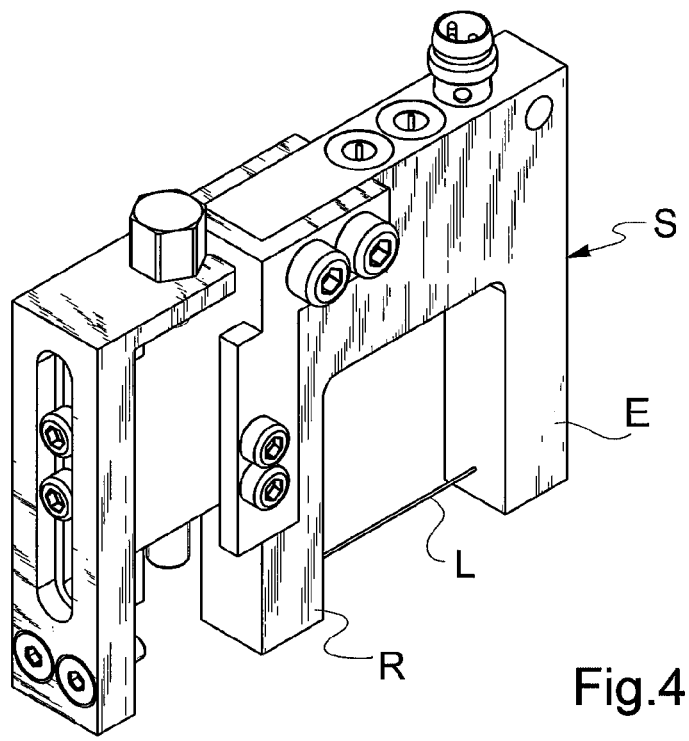
FIG. 4 is a perspective view of the optical detecting device.

In the particular embodiment illustrated in the drawings, the optical detecting device D has a laser emitter and receiver arranged on opposite sides of the bearing. FIG. 4 illustrates a support S intended to be arranged straddling the bearing to be tested; the laser emitter (not shown) is housed in a first branch E of the support, while the receiver (not illustrated) is accommodated in a second branch R separated from the first by an empty space in which the bearing is placed. In an alternative embodiment (not shown), the emitter and receiver are arranged on the same side with respect to the bearing, while a reflecting element is provided on the opposite side, sending the receiver the radiation emitted by the emitter.

In order to measure the contact angle αk, the inner ring 13 is placed in rotation by the mandrel A, on which an encoder (not shown) is applied for detecting the rotation of the inner ring 13 in order to count the number of revolutions accomplished by the inner bearing ring. As an alternative, detection of the revolutions of the rotating ring may be carried out by fitting an encoder directly onto the bearing ring.

Preferably, the mandrel is rotated at constant angular speed, e.g. by means of a brushless electric motor. The optical device D detects the movement of the balls and makes available at the output U a signal indicative of the revolutions of the balls about the rotation axis x. This signal is transmitted to a processor which calculates the angle of revolution of the balls, which corresponds to the angular deviation of the cage. The processor works out the above mentioned angular values, establishes a relationship between them and the diameter of the balls, that is, the average diameter of all the balls, which are substantially identical, and the pitch diameter (i.e. the diameter of the circumference passing through the centers of the balls) and calculates the value of the contact angle αk by means of the following formula:

$$\cos\alpha K = \frac{Dd}{Dw} \cdot \left(1 - \frac{\Delta\gamma + 1440}{1800}\right)$$

where:
αk=contact angle;
Dd=pitch diameter;
Dw=diameter of the balls;
Δγ=angular deviation of the cage after 4 turns carried out by the same cage after 10 complete turns of the inner ring;
1440=represents 4 complete revs of the cage (360°=1 rev so 360°×4=1440°;
1800=represents 5 complete revs of the cage 10 (360°=1 rev, so 360°×5=1800°.

The above formula refers to an exemplary embodiment of the method, in which it is chosen to detect the angular deviation of the cage after 10 complete turns of the inner ring. The invention is not limited to the values of this example.

More particularly, the value Δγ (herein termed "angular deviation" of the cage) is detected as follows. The processor counts the passages of the balls intercepting the radiation emitted by the optical device D in the period during which the inner ring 13 is rotated 10 revs (turns). The number of revs or turns accomplished by the cage coincides with the number of revs of the balls about the central axis of rotation x. This number is calculated dividing the number of passages intercepted by the optical device D by the number of bearing balls (for example 8 balls). Assuming that after 10 revs completed by the inner ring the processor has counted 37 ball passages, this corresponds to slightly more than 4½ revs of the cage (37 passages=4 revs×8 passages+5 passages). The processor will define with Δγ the angle corresponding to the 5 passages exceeding 4 revs.

As will be appreciated, the present invention offers many advantages over the prior art. The absence of parts to be fitted to the cage, and therefore the direct detection of the movement of the balls or of their retaining cage, makes the technique applicable also to bearings of small dimensions, regardless of the geometric shape (flanged or not) of the rings. The measurement is very accurate in that it is not negatively invalidated by the play existing between the balls and the cage. The measurement is very accurate also because nothing is fitted on the cage to detect its rotation, and therefore there is no variation in the inertial mass of the cage.

Another advantageous aspect, related to the absence of elements to be fitted on the bearing, is that the technique particularly lends itself to being carried out with the use of automated handling equipment to apply the bearings on the mandrel and place them back into the production line with the measurement carried out.

The principle of the invention remaining the same, the details of construction and embodiments may be varied widely with respect to that described and illustrated, without thereby departing from the scope of the present invention. This applies, for example, to the choice of the type of optical device generating the radiation. There is the option of the radiation intercepting the balls, but it is possible to think of different solutions in which the radiation intercepts the cage. It will be further appreciated that the solution according to the invention does not necessarily require the axial pressure to be applied to the outer ring. As an alternative to that described and illustrated, the invention can also be applied to the case in which the pusher assembly acts on the inner ring and the outer ring is rotated about the axis x.

I claim:

1. A method of determining the contact angle of a ball bearing, the method comprising:
providing a ball bearing having a central axis and including an outer ring, an inner ring spaced axially from the outer ring so as to define a gap, a retaining cage disposed generally between the outer and inner rings, and a plurality of balls circumferentially spaced by the retaining cage and radially interposed between the outer and inner rings, each ball having a diameter;
providing optical detecting means configured to project radiation;
rotating one of the inner and outer rings about the central axis while the other one of the inner and outer rings remains substantially stationary;
detecting a number of revolutions about the axis of at least one of the balls, or the cage, or both by projecting radiation from the optical detecting means through the gap in the bearing such that the radiation is intercepted directly by the at least one of the balls, or the cage, or both;
detecting a number of revolutions about the axis of the rotating one of the inner and outer rings; and
determining the contact angle using the detected number of revolutions of the rotating one of the inner and outer rings, the detected number of revolutions of the at least one of the balls, or the cage, or both, the diameter of each ball, and a pitch diameter of the plurality of balls.

2. The method according to claim 1, wherein the radiation projected by the detecting means is a laser radiation.

3. The method according to claim 1, wherein the radiation is projected in a direction substantially parallel to the central axis of the bearing.

4. The method according to claim 1, wherein the optical detecting means include an emitter and a receiver arranged such that the bearing is disposed generally between the emitter and the receiver.

5. The method according to claim 1, wherein the bearing has two opposing sides and the optical detecting means include an emitter and a receiver arranged on one of the two bearing sides and a reflecting means arranged on the other one of the two bearing sides.

6. The method according to claim 1, wherein the step of rotating one of the inner and outer rings includes applying a constant axial load to the stationary one of the outer and inner rings.

7. The method according to claim 1, wherein the rotating one of the inner and outer rings is the inner ring and the stationary one of the inner and outer rings is the outer ring.

8. The method according to claim 1, wherein the rotating one of the inner and outer rings is rotated at a generally constant angular speed.

\* \* \* \* \*